INVENTOR

ISAMU MURATA

By: McGlew and Toren

ATTORNEY

INVENTOR

ISAMU MURATA

By: McGlew and Toren

ATTORNEYS

INVENTOR
ISAMU MURATA
By: McGlew and Toren
ATTORNEYS

FIG 25
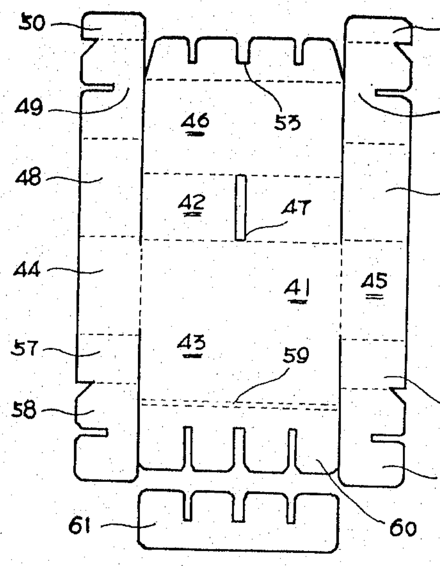
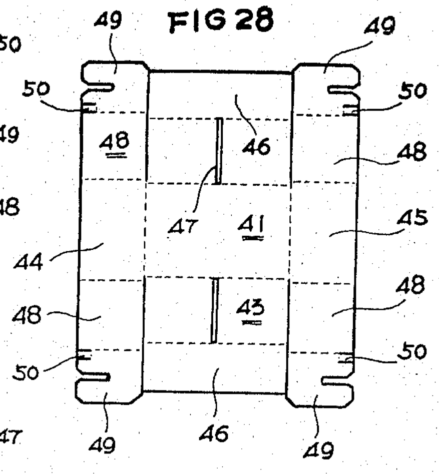
FIG 29
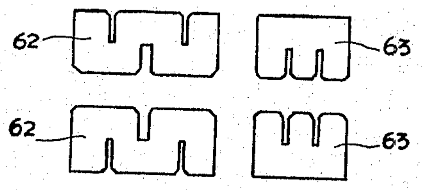
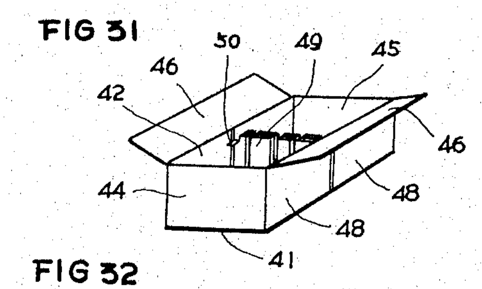
FIG 30
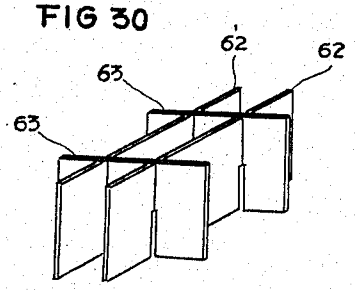
FIG 32
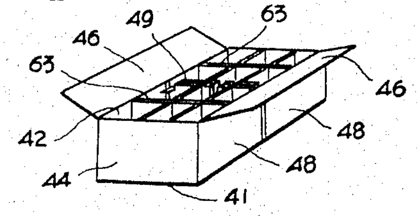
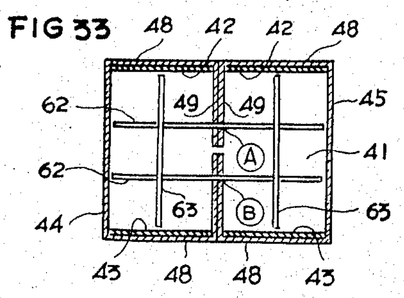
INVENTOR
ISAMU MURATA
By: McGlew and Toren
ATTORNEYS United States Patent Office 3,363,824
Patented Jan. 16, 1968

3,363,824

PAPERBOARD BOX

Isamu Murata, 754-3 Higashinakanobu, Shinagawa-ku, Tokyo, Japan

Filed June 24, 1964, Ser. No. 377,718
Claims priority, application Japan, July 1, 1963, 38/34,686
1 Claim. (Cl. 229—27)

The present invention relates to a process for fabricating a paperboard box and particularly the invention relates to a basic process for making a paperboard box economically.

Fabrication of a paperbox has been attempted heretofore by a number of systems classified under categories. There have also been attempted several improved methods such as based on the same standard and also a cutting system which has recently developed with the trend of technical progress. So far as the cutting system is concerned, an attempt was made to assemble the components of the box into a whole body for making a particular type of box, but no attempt has ever been made to conceive fundamental process which can be applied in various ways.

Even with respect to a flat and openable-cover box, it has not been solved yet how to make cutting economically to increase strength against pressure from outside.

With this in view, the present invention proposes to present a fundamental process covering wide applicability in the manufacture of a paperbox by the use of a cutting process.

The principal object of the invention is to provide a system for joining either one pair of front and rear or right and left side boards with other pair of boards in a special manner and thus to compose a box body integrally. The invention is characterized therefore by providing either one pair of side boards being passive and the other positive in relative junction to work in a close connection with each other.

According to this principle, the invention can provide a peculiar construction to the passive and positive side boards, i.e., the passive side boards having the cut slots to be inserted with positive boards and positive side boards having the extensions to be inserted into said slots.

The extension of the positive side board is inserted into the slot of the passive side board from outside and pulled inwardly to form connections of passive and positive side boards on the passive side boards in the four corners of the box body by way of junction of both side boards. The extended part of the positive side board which is pulled into the interior of the box can be folded inwardly from the passive side board whereby it is possible to form a re-junction to the extended parts or middle walls by straight extension of the parts or intermediate partition boards as occasion requires. The invention thus makes it available to cut paperboards without loss, to make cutting by one process to work. Since the whole box body is composed of a single paperboard, partial load placed on the box body is made to disperse over the whole body. The box is thereby increased in strength against pressure by combined effect of dispersion of load and junction of side boards.

Figures 1, 2, 3, 4, 5, 6, 7, 8, 9, 10, 11:
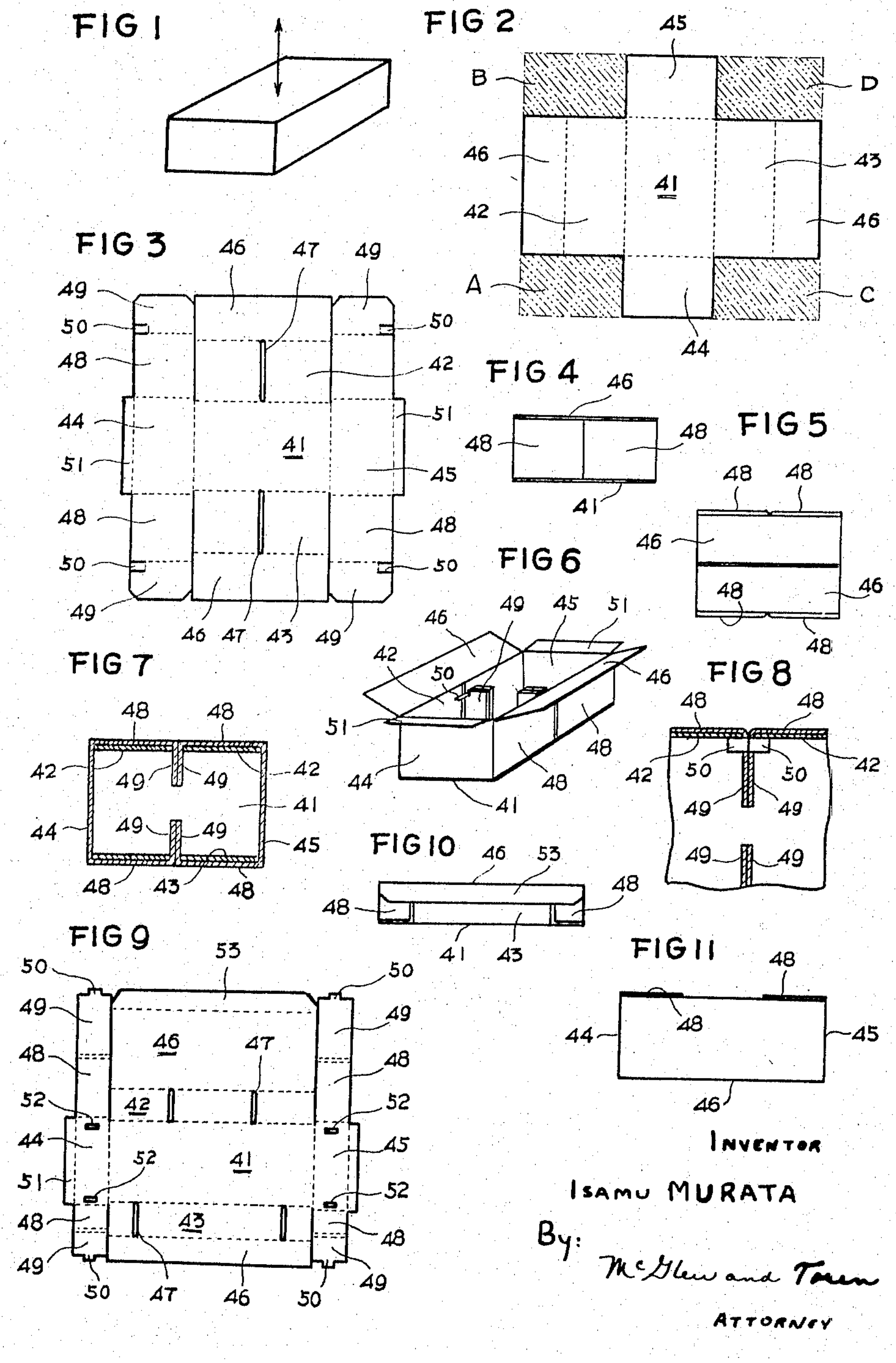
Figures 12, 13, 14, 15, 16, 17, 18:
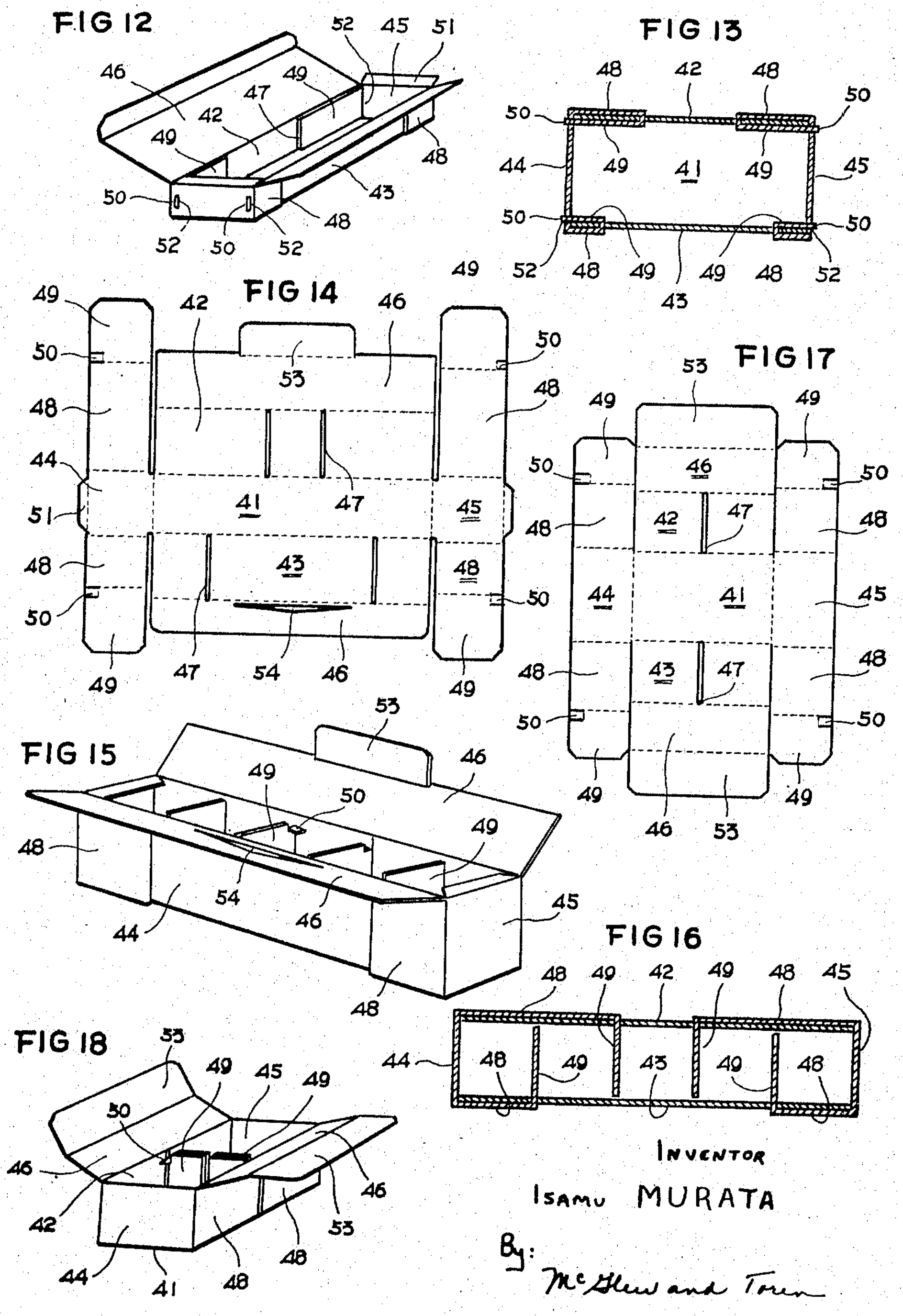

The invention is disclosed in the accompanying drawings in which; FIGURE 1 is a perspective view of a flat box with an openable upper cover showing the invention applied. FIGURE 2 is a development view of a box in FIGURE 1. FIGURES 3 to 8 show an example of an embodiment showing the invention applied, among which FIGURE 3 is a development view; FIGURE 4 is a side view of the box after fabricated. FIGURE 6 is a box in perspective during fabrication; FIGURE 7 shows a transversal cross section of a side board (wall body); and FIGURE 8 shows a partly enlarged cross section of the box in FIGURE 7. FIGURES 9 to 13 are the second example of an embodiment of the invention applied, among which FIGURE 9 is a development view; FIGURE 10 is a side view after fabricated; FIGURE 11 is a plan view after fabricated. FIGURE 12 is a perspective view during fabrication; and FIGURE 13 is a cross section of side board (wall body) of the box of the invention applied. FIGURES 14 to 16 show the third example of an embodiment, among which FIGURE 14 is a development view; FIGURE 15 is a perspective view during fabrication; and FIGURE 16 shows a transversal cross section of a side board (wall body) of the invention applied.

Figure 19:
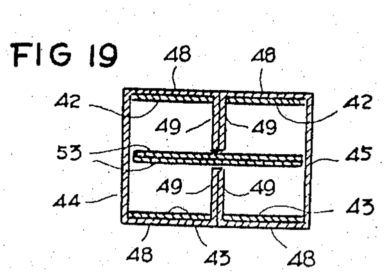

FIGURES 17 to 19 show the fourth example of an embodiment of the invention applied, among which FIGURE 17 is a development view; FIGURE 18 is a perspective view during fabrication; FIGURE 19 shows a transversal cross section of a wall body made of extended pieces of side board and a cover board.

Figure 20:
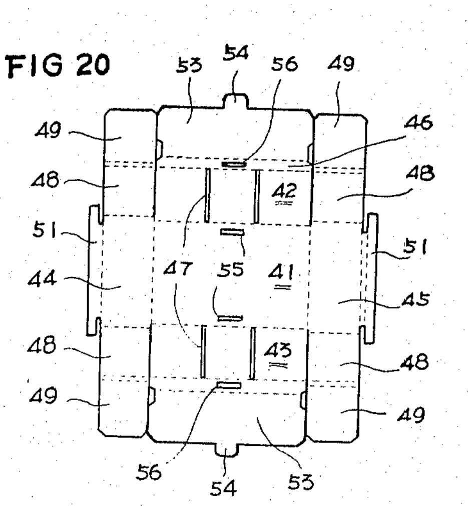
Figure 23:
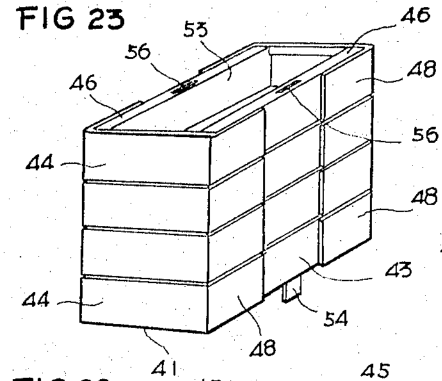
Figure 21:
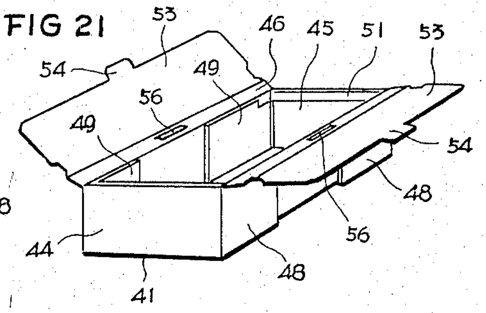
Figure 22:
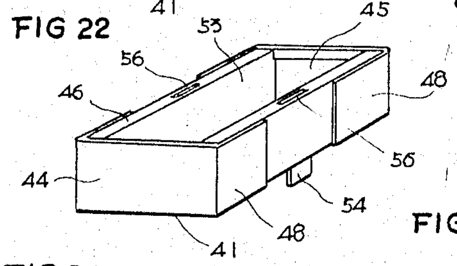
Figure 24:
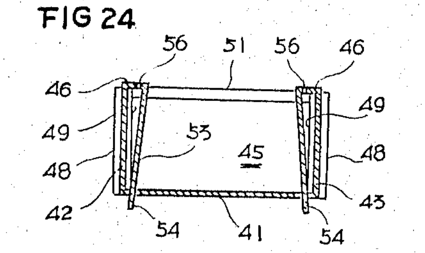

FIGURES 20 to 24 show the fifth example of the invention applied, among which FIGURE 20 is a development view; FIGURE 21 is a perspective view during fabrication; FIGURE 23 is a perspective view showing number of boxes fabricated according to this example of an embodiment and laid one upon another; FIGURE 24 shows a cross sectional view of a wall body made of extended pieces of a side board and cover board.

Figure 26:
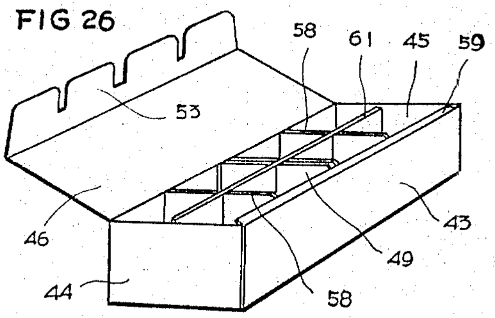
Figure 27:
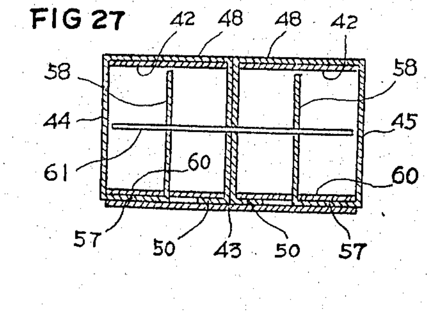

FIGURES 25 to 27 show the sixth example of an embodiment of the invention applied, among which FIGURE 25 is a development view; FIGURE 26 is a perspective view during fabrication; FIGURE 27 is a cross section of a wall body constituted of extended pieces of side board and a cover board and a separated partition board.

FIGURES 28 to 33 show the seventh example of an embodiment of the invention applied among which FIGURE 28 is a development view of the box body; FIGURE 29 is a development view of a partition board; FIGURE 30 is a perspective view of a partition board after fabricated, FIGURE 31 is a perspective view of a box during fabrication; FIGURE 32 is a perspective view of a box during fabrication where the fabricated partition board is further fabricated, and FIGURE 33 is a cross sectional view of a wall constituted of a side board of the box and the accompanying partition board.

In FIGURE 2 there is shown a bottom board 41 located in a position as arranged by the design previously. Out of the four joined side boards, the front and rear side boards 42, 43 are made passive boards and the right and left boards 44, 45 positive boards and the passive side boards 42, 43 are folded on a crease line on both sides of a cover board 46 (folding is made in various ways according to design). The box is provided with six faces which are indispensable for constituting a box. Which one of the side boards is made positive are passive can be decided according to a design corresponding to the purpose. The positive side boards 44, 45 are provided with extended pieces of preferable length in parallel with the height of the side board respectively upward and downward the side board (A, B, C, D on the corners are put into scraps). The passive side boards are provided with slots corresponding height and thickness of the extended pieces of the positive side boards.

FIGURE 3 and also other figures show examples of embodiments of the invention applied. As seen in the respective figures, the extended pieces of the positive side boards bring about side board junction and various functional effects within the box in combination with the passive side boards.

Said extended pieces can be assigned to outside reinforcing boards 8, inside working boards (working as inside reinforcing boards or intermediate wall boards) 9, and inside fixing boards 10. Length of respective board and size of folding can be decided according to the design corresponding to purpose.

The insert slot 7 of the passive side board can receive said function of the extended piece of the positive side board and produce a fixed junction with said side board so that the opening position and number of said slots may be fixed in conformity with the design arranged previously.

The invention has a construction consisted of combination of positive side boards and passive side boards as a basic principle. The relation of junction and the function of the positive side board are illustrated as follows.

Since the construction of the positive side board and the passive side board is definitely fixed, the extended pieces 44, 45 of the positive boards serving as inside working board 49 or inside fixing board 50 are inserted from outside of the passive side boards 42, 43 into the interior of the box. The inserted portion in the box is further pulled into the interior and the outside reinforcing board 48 of the extended piece is fitted closely to the outer face of the passive side boards 42, 43.

By this insertion, the entire or major part of the corner including an edge of the box or the passive side board 42, 43 is combined by outside reinforcing board 48 extended from the positive side board 44, 45 from outside of the passive side board 42, 43. This combination with outside reinforcing board 48 does not give any obstacle to practical use as the said outside reinforcing board 8 is as high as the passive side board 42, 43 and the both boards adhere closely with each other and just increases strength of the box against outside pressure.

The inside working board (inside reinforcing board) 49 as an extension pulled into the box according to specification is folded inside the passive side board 42, 43 at right angle to the passive side board and adhered thereto and further inserted into a slot by the inside fixing board fixedly. By this operation there is obtained a three-fold layer by extensions of inside and outside reinforcing boards 48, 49 with the passive side board 42 or 43 situated in the middle therebetween.

The inside working board (intermediate wall) 49 as an extended part of the positive side board 44, 45 is pulled through a slot 47 and an intermediate wall is provided on the crease line that the inserted piece may be placed, to make a solid partition wall so that the space in the box is divided into two sections. The inserted inside working board (intermediate partition board) 49 is further pulled on from one or two insert slots separately to one or both of the passive side boards 42, 43 and on the crease line where inserted within the box. These intermediate boards can be each inserted with other boards so as to form many more and smaller sections in the box.

FIGURES 3 to 8 show the first example of an embodiment of the invention applied. In the middle of the passive side board 42, 43 there is inserted each insert slot 47, into which inserted the inside working board (intermediate wall) 49 of the extended piece of the positive side board 44, 45 and the end of the inserted piece is placed on a straight line. In order to keep this construction solid, the inside fixing board (check board) 50 at the root of the intermediate wall 49 is opened as shown enlarged in FIGURE 8.

According to this design, the passive side board 42, 43 is laid by the outside reinforcing board 48 extended from the positive side board doubly and there is obtained an intermediate wall 49 which is laid doubly in the center of the space in the box. This construction is made of single paperboard so that the whole body provides strong resistance to the pressure of both vertical and lateral directions.

The intermediate wall 49 too can support the cover board 46 strongly by the aid of the flap 51 on both sides of the intermediate wall 49.

The box of this example is suitable for packing goods in pieces.

In relation with this example, various other modifications are obtainable (Example 4 shown in FIGURES 17 to 19 and Example 7 in FIGURES 28 to 33).

FIGURES 9 to 13 show Example 2, in which each two insert slots 47 are provided on the passive side boards at equal distances from the center of each board. In these insert slots are inserted extended pieces of the positive side board 44, 45 or inside fixing board 50, inside working board (inside reinforcing board) 49 one after another and the inserted pieces are folded at right angles being in parallel with the passive side board 42, 43. The inside fixing board 50 is inserted into the fixing slot 52 provided on the positive side board 44, 45 and fixed thereto. As shown in FIGURE 13, this example proposes four corners in a three fold construction except in the middle part of the passive side board. The result can make resistance to outside pressure very strong and obtain a large space in the section of the box suitably as a flat box with open surface.

FIGURES 14 to 16 show the Example 3 of the invention applied, in which the passive side board 42, 43 has each two insert slots 47 at equal distances from the center. To the slot is inserted an inside working board (wall board) 49 as extended from the positive side board 44, 45 and is fixed by the inside fixing board (check board) 50.

According to this construction, the interior space of the box can be partitioned into five equal sections by means of four wall board of the positive side boards on the right and left and the upper and lower sides. In this construction, the box body and the partition board are both separated from each other because they are constituted of a single paperboard so as to make a solid box integrally built up.

A partial modification in the design of this construction will easily make a box body to have more than two sections. By use of other separate pieces, it is also possible to make a box having a required number of small sections such as 46, 48, 50, 52 and so on.

FIGURES 17 to 19 show Example 4 of the invention applied, which is another application of Example 1 shown in FIGURES 3 to 8. The main construction is almost the same with that of Example 1, but particular difference resides in the provision of the cover board extension 53 attached to the cover board 46 which is similarly high as the side board. By closing the cover board extension with the cover board, the space in the box is divided into four sections by partitioning it longitudinally and vertically with double layer walls. The walls in crosswise shape can reinforce other four side walls against strong pressure from outside.

FIGURES 20 to 24 show Example 5 of the invention applied, in which the main construction conforms to the Example 2 shown in FIGURES 9 to 13. This example is featured that the cover board 46 will turn to a board edge when the box is built up and a cover board extension 53 is provided connected to the cover board and the fixing board of a cover board extension 54. The inside working board (inside reinforcing board) 49 combined with the passive side board 42, 43 with a flap 11 on both sides of the positive side board 44, 45. Further the cover board extension 53 is folded inwardly and the fixing board 54 of the cover board extension is inserted into the fixing slot 55 fixedly on the bottom board 41. In this manner, the passive side board 42, 43 is doubled in layer in the central part and the right and left sides are laid with each other in four fold layers as shown in FIGURE 24.

The present example is arranged to provide a board edge cover 46 on the side of the passive side board 42, 43 while no edge cover is provided on the other side. In order to carry goods in the box of this example, they are fittedly laid one upon another in several layers and only the uppermost box is covered with a separate cover to be bound with said uppermost box. In order to secure the layers of the boxes fittedly in right positions relative to others, the fixing board 54 of the cover board extension is made so long in consideration of the thickness of the bottom board 41 and inserted into the insert slot 56 provided on the cover board 43.

FIGURES 25 to 27 show Example 6 of the invention applied. In this example, one of the passive side boards 42 is provided with the slot 47 only in the center, to which is inserted the fixing board 50 of the partition board 49 extended from the positive side board 44, 45 are connected in the way as proposed by this invention, while other side board 43 and the right and left side boards 44, 45 are connected with each other in another way than proposed by this invention and thereby is obtained a box having eight small sections which are partitioned adequately. In addition to the components of the box itself other partition board 61 are also employed for fabrication of the box.

The features of this example are peculiar in that the fixing board 50 upward extension of the positive side board 44, 45 and the fixing board 57 of the lower extension are fixed together by the lower passive board 43 and its extension 60 fixed in combination. The upper side wall and the lower side wall are connected fixedly by a doubled partition board 49 situated in the center and thereby is composed a box having eight sections by the partition board 58 provided in extension under the positive side board and the partition board 61.

FIGURES 28 to 33 give Example 7 of the invention applied, in which the main construction is a modification of Example 1 shown in FIGURES 3 to 8. This example is featured with the working board (intermediate wall) 49 of the extension of the positive side board being provided with a partition board; the fabricated box shown in FIGURE 31 is further applied partition board 62, 63 so as to make the box have twelve small sections. As shown in FIGURE 33 the partition board 62, 63 joins with the intermediate wall 49 of the box at the points of A and B making the box more solid as a whole.

By increase or decrease of the number of the partition board 62, 63, it's easy to make a box having a desirable number of sections.

The present invention involves such process as above described and has for its principle a positive function of the side board produced from relative junction of said boards. Accordingly the application and improvement of the invention is very broad. By this process it is possible to allow a box to have a desirable number of layers of side boards. By means of the function of the positive side board it is available to have more layers of side boards in addition to provide intermediate walls and partitions as required. Said layers and intermediate wall and middle partitions are incorporated into one of same material without use of other materials, so that there is obtained a box excellent in resistance to pressure. Also there is ensured economy in cutting, light pressure load and a quick junction of component boards.

I claim:

1. A container comprising, a bottom wall-forming panel, upstanding front side, rear side, right-end and left-end wall-forming panels folded upwardly from the front side, rear side, right-end and left-end of said bottom wall-forming panel, said front side and rear side wall-forming panels having a slot extending substantially vertically, an extended flap hingedly connected to each side of said right-end and said left-end wall-forming panels and extending outwardly from said right-end wall-forming panel toward said left-end wall-forming panel and overlying the respective said front side and said rear side forming panels up to said slots and extending outwardly from left-end wall-forming panel toward said right-end wall-forming panel and overlying the respective said front side wall-forming panel and said rear side wall-forming panel up to said slots, an intermediate wall flap hingedly connected to the outer end of each of said extended flaps and extending through the slots from the associated front side and rear side wall-forming panels toward the opposite side of said container, and a tab defined on each of said intermediate wall-forming flaps adjacent the connection to the associated extended flap and being folded downwardly on the interior of said container from the top surface of said intermediate wall-forming flap to define outwardly extending fixing portions abutting along associated said front side and said rear side wall-forming panels for holding said intermediate wall-forming flaps substantially perpendicular to the associated front side wall-forming panel and rear side wall-forming panel.

References Cited

UNITED STATES PATENTS

| | | | |
|---|---|---|---|
| 650,625 | 5/1900 | Webb | 229—32 |
| 2,578,775 | 12/1951 | Belsinger | 229—27 |
| 2,578,776 | 12/1951 | Belsinger | 229—27 |
| 2,578,777 | 12/1951 | Belsinger | 229—27 |
| 2,648,483 | 8/1953 | Belsinger | 229—27 |

DONALD F. NORTON, *Primary Examiner.*

BERNARD STICKNEY, *Examiner.*

R. PESHOCK, *Assistant Examiner.*